United States Patent [19]

Udagawa

[11] Patent Number: 4,976,445
[45] Date of Patent: Dec. 11, 1990

[54] STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 375,626

[22] Filed: Jul. 5, 1989

[51] Int. Cl.$^5$ .............................................. F16J 15/08
[52] U.S. Cl. ..................................... 277/231; 277/234; 277/235 B
[58] Field of Search ..................... 277/235 B, 231-234

[56] References Cited

U.S. PATENT DOCUMENTS

| | | |
|---|---|---|
| 3,352,564 | 11/1967 | Johnson ............................ 277/235 B |
| 3,567,234 | 9/1969 | Skrycki ............................ 277/235 B |
| 4,213,620 | 7/1980 | Kennedy et al. .................. 277/235 B |
| 4,728,110 | 3/1988 | Nakasone ........................ 277/235 B |
| 4,776,601 | 10/1988 | Yamada ........................... 277/235 B |
| 4,834,399 | 5/1989 | Udagawa et al. ................ 277/235 B |

FOREIGN PATENT DOCUMENTS

| | | | |
|---|---|---|---|
| 0006127 | 9/1980 | European Pat. Off. | ........ 277/235 B |
| 0160549 | 7/1986 | Japan | ................. 277/235 B |

*Primary Examiner*—Allan N. Shoap
*Assistant Examiner*—Daniel G. DePumpo
*Attorney, Agent, or Firm*—Kanesaka and Takeuchi

[57] ABSTRACT

A steel laminate gasket of the invention is installed in an internal combustion engine. The gasket comprises a first plate and a second plate situated above the first plate. The first plate includes a base portion extending throughout the entire area of the gasket, a curved portion to define a first hole, and a flange situated above the base portion. A bead is formed on the flange to extend toward the base portion. When the gasket is tightened, the flange extends freely outwardly, so that the first bead can deform at a relatively low pressure. Also, the flange can slide easily relative to the cylinder head or cylinder block.

9 Claims, 2 Drawing Sheets

STEEL LAMINATE GASKET

BACKGROUND OF THE INVENTION AND RELATED ART STATEMENT

The present invention relates to a steel laminate gasket with sealing means readily responsive to outer force applied thereto.

Recently, an engine of an automobile has been developed to become light in weight and provide high power. Since a steel laminate gasket is mechanically strong and can seal around cylinder holes with high combustion pressure, the steel laminate gasket has been used widely.

One of a conventional steel laminate gasket is shown in FIG. 8, wherein a gasket 20 comprises an upper plate 21, a lower plate 24, a middle plate 22, and a middle plate 23 with a bead 23a around a cylinder hole Hc to be sealed. The lower plate 24 is provided with a curved portion 24a around the cylinder hole Hc, and a flange 24b situated above the upper plate 21.

In some cases, the middle plate 23 is deleted, and instead, a bead is formed in the lower plate 24 to surround the cylinder hole Hc.

The conventional steel laminate gaskets as stated above seal around the cylinder hole properly. However, in case a steel laminate gasket is required to be thin and to seal around a hole at a relatively lower tightening pressure, the above gasket 20 as well as the gasket with the bead at the lower plate are not suitable. The gasket 20 is not suitable because the gasket 20 is relatively thick. Also, the gasket with the bead at the lower plate is not suitable, because a relatively high tightening pressure is required for sealing the gasket since the curved portion is formed adjacent to the bead.

Accordingly, one object of the invention is to provide a steel laminate gasket which is thin and can seal properly with a relatively low tightening pressure.

Another object of the invention is to provide a steel laminate gasket as stated above, which can relatively easily slide relative to a member that the gasket abuts when a stress is applied to the gasket.

A further object of the invention is to provide a steel laminate gasket as stated above, wherein a relatively wide sealing area is provided around a hole to be sealed.

A still further object of the invention is to provide a steel laminate gasket as stated above, wherein the gasket can be easily and economically manufactured.

Further objects and advantages of the invention will be apparent from the following description of the invention.

SUMMARY OF THE INVENTION

In accordance with the present invention, a steel laminate gasket is installed in an internal combustion engine having at least one hole to be sealed. The gasket basically comprises a first plate and a second plate situated above the first plate.

The first plate includes a base portion extending throughout the entire area of the gasket, at least one first hole corresponding to the hole of the engine, and a curved portion extending substantially perpendicularly to the base portion to define the first hole. A flange is integrally formed with the curved portion to locate above the base portion, and at least one first bead is formed in the flange to extend toward the base portion.

The second plate is situated above the base portion at a side of the flange. The second plate is provided with a second hole having a diameter larger than that of the flange. Therefore, when the first and second plates are assembled, the flange is situated inside the second hole. In case the gasket is tightened, the flange can extend freely outwardly, so that the first bead can be deformed without excessive force.

Also, a part of the flange contacts a member to be sealed, i.e. a cylinder head or cylinder block. Since the entire flange does not contact a member to be sealed, the flange can easily slide relative to the member to be sealed. Namely, excessive tension between the gasket and the member to be sealed is not formed.

The gasket may include a third plate between the first and second plates, or above the second plate. In any situations, a peripheral portion of the third plate is provided with auxiliary sealing means, which is located between the flange and the base portion of the first plate.

The first plate may include a second bead at the base portion. The distance from the first hole to the first bead is different from the distance from the first hole to the second bead. The second bead supports the flange when the gasket is tightened. As a result, a wide sealing area is formed on the flange by the first and second beads.

DETAILED DESCRIPTION OF PREFERRED EMBODIMENTS

Figure 1:
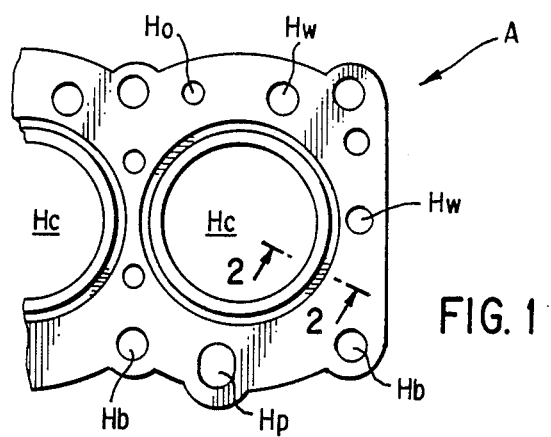
FIG. 1 is a plan view of a part of a first embodiment of a cylinder head gasket of the present invention.
Figure 2:
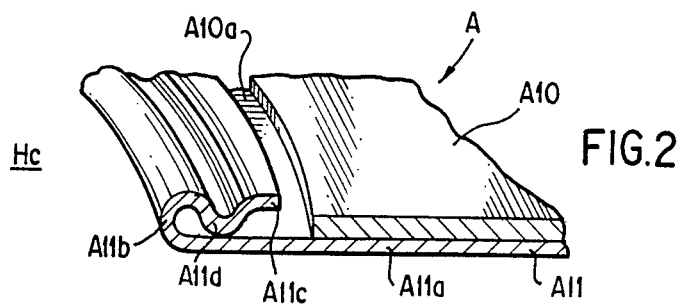
FIG. 2 is a perspective section view along a line 2—2 in FIG. 1.

Referring to FIGS. 1 and 2, a first embodiment A of a steel laminate gasket of the invention is shown. The gasket A is a cylinder head gasket and is provided with cylinder holes Hc, water holes Hw, oil holes Ho, push rod holes Hp and so on. Sealing mechanisms of the invention are applied around the cylinder holes Hc, and areas around the water holes Hw, oil holes Ho and push rod holes Hp are sealed by other sealing means. However, the sealing mechanisms of the invention may be employed around other holes.

Since the sealing mechanisms of the invention are used around the cylinder holes Hc, the sealing mechanisms around the cylinder holes Hc are explained. The areas around other holes may be sealed by any kind of sealing means.

As shown in FIG. 2, the gasket A comprises an upper plate A10 and a lower plate A11. The lower plate A11 is provided with a base portion A11a extending throughout the entire area of the gasket A, a curved portion A11b to define the cylinder hole Hc and a flange A11c situated above the base portion A11a. A bead A11d extending toward the base portion A11a is formed on the flange A11c.

The upper plate A10 is provided with a hole A10a larger than the diameter of the flange A11c. When the gasket A is assembled, the upper plate A10 is situated above the base portion A11a. The upper plate A10 does not pile over the flange A11c.

When the gasket A is situated between a cylinder head and a cylinder block (both not shown) and is tightened the flange A11c is compressed, so that the curved portion A11b and bead A11d deform. Since an outer end of the flange A11c does not contact any member, the outer end of the flange expands outwardly as the bead A11d forms a plurality of corrugated beads and the curved portion A11b deforms. Namely, the bead A11d and curved portion A11b are easily compressed to seal around the cylinder hole Hc without applying a large amount of force to the flange.

Also, since the bead A11d extends toward the base portion A11a, the entire flange A11c does not contact the cylinder head or cylinder block. Therefore, the flange A11c can slide easily relative to the cylinder head or cylinder block when a tension or load is applied to the flange. Namely, when the engine together with the gasket A is heated in operating the engine, the gasket can slide easily based on the expansion due to heat relative to the cylinder head and cylinder block.

Further, since the gasket A is formed of two plates, the thickness of the gasket A can be made thin. Still, the gasket A can seal properly around the cylinder hole Hc.

Still further, in the gasket A, the sealing mechanisms, i.e. the bead A11d and the curved portion A11b, are formed on one plate, so that the rest of the gasket can be easily designed or arranged.

Figure 3:
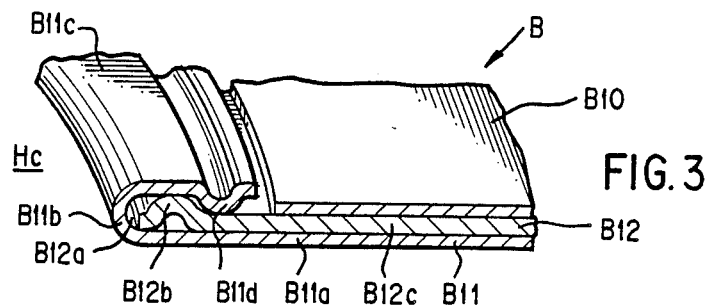
FIGS. 3-7 are perspective section views, similar to FIG. 2, of second to sixth embodiments of the gasket of the invention.

FIG. 3 shows a second embodiment B of a steel laminate gasket of the invention. The gasket B comprises an upper plate B10, and a lower plate B11 having a base portion B11a, a curved portion B11b, a flange B11c and a bead B11d, similar to the gasket A. However, the gasket B further includes a plate B12 having a hole B12a, a bead B12b around the hole B12a, and a main portion B12c.

The main portion B12c is located between the plate B10 and the base portion B11a. The bead B12b is located behind the flange B11c, and the bead B11d is located above the main portion B12c. Therefore, when the gasket B is compressed, the bead B12b wide sealing pressure around the cylinder hole Hc. The rest of the operation of the gasket B is the same as the gasket A.

Figure 4:
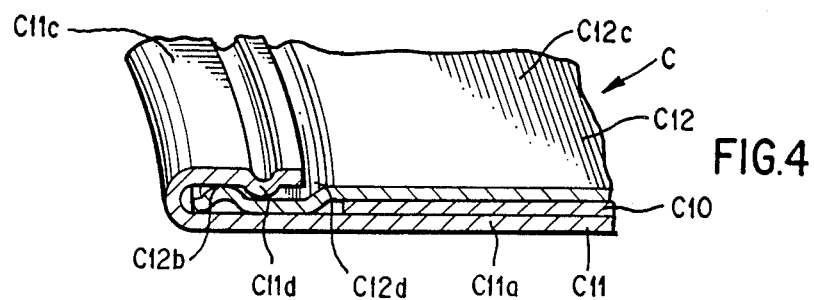

FIG. 4 shows a third embodiment C of a steel laminate gasket of the invention. The gasket C comprises a plate C10, a plate C11 with a base portion C11a, a flange C11c and a bead C11d, and a plate C12 with a bead C12b and a main portion C12c. In the gasket C, however, the plate C12 further includes a stepped portion C12d so that the plate C10 is situated between the main portion C12c and the base portion C11a. The gasket C operates as in the gasket B.

Figure 5:
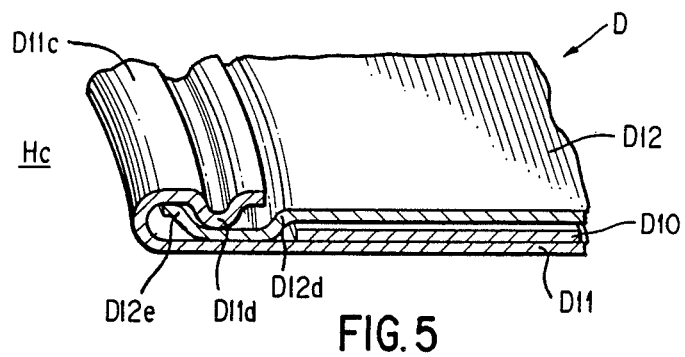

FIG. 5 shows a fourth embodiment D of a steel laminate gasket of the invention. The gasket D comprises a plate D10, a pate D11 with a flange D11c and a bead D11d, and a plate D12 with a stepped portion D12d, similar to the gasket C. However, the plate D12 is provided with a bent portion D12e instead of a bead. The operation of the bending portion D12e is the same as that of the bead C12b in the gasket C. The gasket D operates as in the gasket C.

Figure 6:
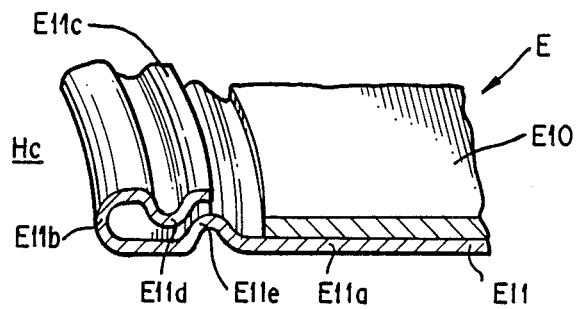

FIG. 6 shows a fifth embodiment E of a steel laminate gasket of the invention. The gasket E comprises a plate E10, and a plate E11 with a curved portion E11b, a flange E11c and a bead E11d, similar to the gasket A. However, the plate E11 further includes a bead E11e at a base portion E11a.

When the gasket E is compressed, at first, the bead E11e contacts the flange E11c, and the bead E11d contacts the base portion E11a. As the gasket E is further compressed, the bead E11d expands outwardly and contacts the bead E11e. As the gasket E is still further compressed, the beads E11d, E11e push against each other and form a plurality of corrugated beads. Namely, in the gasket E, a relatively wide and strong surface pressure is obtained, when the gasket E is compressed.

Figure 7:
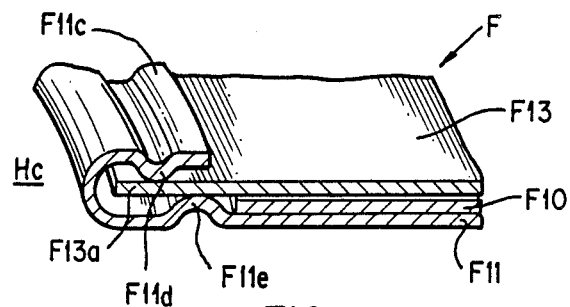
Figure 8:
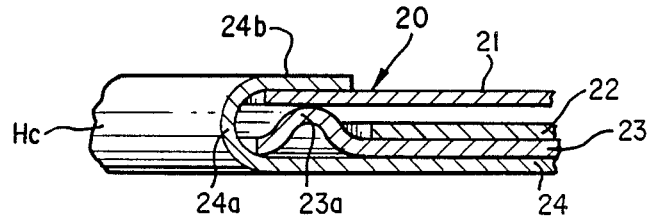
FIG. 8 is a section view of a part of a conventional steel laminate gasket.

FIG. 7 shows a sixth embodiment F of a steel laminate gasket of the invention. The gasket F comprises a plate F10, and a plate F11 with a flange F11c and beads F11d, F11e, similar to the gasket E. The gasket F further includes a plate F13 situated above the plate F10. A periphery F13a of the plate F13 adjacent the cylinder hole Hc is situated between the beads F11d, F11e.

When the gasket F is compressed, at first, the plate F13 bent along the configuration of the beads F11d, F11e. Thereafter, the beads F11d, F11e deform to form a plurality of corrugated beads to seal around the cylinder hole Hc. In the gasket F, wide and strong surface pressure is obtained.

In accordance with the present invention, a gasket is at least formed of two plates. One plate is provided with sealing mechanism around a hole to be sealed, so that the gasket can be easily designed. Also, a bead is formed on a flange above a base portion of a plate, so that sealing can be made at a relatively lower pressure, and the flange can easily slide against the cylinder block or cylinder head.

While the invention has been explained with reference to the specific embodiments of the invention, the explanation is illustrative and the invention is limited only by the appended claims.

What is claimed is:

1. A steel laminate gasket for an internal combustion engine having at least one hole to be sealed, comprising:
a first plate including a base portion extending throughout the entire area of the gasket, at least one first hole corresponding to the hole of the engine, a curved portion extending substantially perpendicularly to the base portion and defining the first hold, a flange located above the base portion to extend away from the first hole, at least one first bead formed int he flange to extend toward the base portion, and an annular space on the flange corresponding to the first bead so that the flange except the space is adapted to substantially contact an engine block when the gasket is tightened, and
a second plate situated above the base portion of the first plate at the side of the flange, said second plate having a second hole with a diameter larger than that of the flange so that when the first and second plates are assembled, the flange is situated inside the second hole, said flange extending freely outwardly inside the second hole to facilitate deformation of the first bead when the gasket is tightened.

2. A steel laminate gasket according to claim 1, further comprising a third plate having a third hole larger than the first hole, a peripheral portion around the third hole, said peripheral portion being situated between the flange and the base portion of the first plate and having auxiliary sealing means extending toward the flange so that when the gasket is tightened, the auxiliary sealing means supports the flange to provide wide sealing pressure around the hole of the engine, and a main portion outside the periphery portion.

3. A steel laminate gasket according to claim 2, wherein said main portion is situated between the first and second plates, and said auxiliary sealing means is a bead.

4. A steel laminate gasket according to claim 2, wherein said third plate further includes a stepped portion at a boundary between the peripheral portion and the main portion, said main portion being located above the second plate.

5. A steel laminate gasket according to claim 4, wherein said auxiliary sealing means is a bead.

6. A steel laminate gasket according to claim 4, wherein said auxiliary sealing means is a bent portion attached to the flange.

7. A steel laminate gasket according to claim 1, wherein said first plate further includes a second bead at the base portion the distance from the first hole to the first bead being different from the distance from the first hole to the second bead so that the second bead supports the flange when the gasket is tightened.

8. A steel laminate gasket according to claim 7, wherein the second bead is located outside the first bead.

9. A steel laminate gasket according to claim 7, further comprising a third plate having a third hole, a peripheral portion formed around the third hole and situated between the flange and the base portion, and a main portion formed around the peripheral portion and located above the second plate.

* * * * *